United States Patent [19]

Kagawa

[11] Patent Number: 5,608,545
[45] Date of Patent: Mar. 4, 1997

[54] FACSIMILE DEVICE AND COMMUNICATION CONTROL METHOD THEREOF

[75] Inventor: Tetsuya Kagawa, Zama, Japan

[73] Assignee: Ricoh Company, Ltd., Tokyo, Japan

[21] Appl. No.: 373,456

[22] Filed: Jan. 17, 1995

Related U.S. Application Data

[63] Continuation of Ser. No. 181,099, Jan. 13, 1994, abandoned.

[30] Foreign Application Priority Data

Jan. 18, 1993 [JP] Japan .................................. 5-023298
Sep. 22, 1993 [JP] Japan .................................. 5-259479

[51] Int. Cl.⁶ .................................................. H04N 1/32
[52] U.S. Cl. ........................... 358/468; 358/400; 358/442; 379/58; 379/100
[58] Field of Search .................................. 358/400, 442, 358/468; 379/100, 58, 59; 455/38.3, 127, 343

[56] References Cited

U.S. PATENT DOCUMENTS

| | | | |
|---|---|---|---|
| 4,849,815 | 7/1989 | Streck | 379/100 |
| 4,856,046 | 8/1989 | Streck et al. | 379/56 |
| 5,200,991 | 4/1993 | Motoyanagi | 358/442 |
| 5,223,780 | 6/1993 | Hu | 320/14 |
| 5,224,152 | 6/1993 | Harte | 455/343 |
| 5,248,929 | 9/1993 | Burke | 320/48 |
| 5,282,054 | 1/1994 | Oana et al. | 358/442 |
| 5,313,514 | 5/1994 | Kanasashi | 379/58 |
| 5,392,023 | 2/1995 | D'Avello et al. | 358/468 |
| 5,446,905 | 8/1995 | Koshiishi | 358/412 |

*Primary Examiner*—Edward L. Coles, Sr.
*Assistant Examiner*—Thomas L. Stoll
*Attorney, Agent, or Firm*—Oblon, Spivak, McClelland, Maier & Neustadt, P.C.

[57] ABSTRACT

The facsimile device, which can be used with a portable telephone working on a built-in battery, has a voltage detecting section for detecting voltage of a battery of the portable telephone and a control section providing controls to inhibit facsimile communication depending on the voltage detected by the voltage detecting section when facsimile communication is executed with the portable telephone, and the control section determines that life of the battery has been terminated when voltage of the battery in the telephone portable is below a prespecified value and inhibits facsimile communication.

8 Claims, 7 Drawing Sheets

FIG. 4

VOLTAGE OF BATTERY IN
PORTABLE TELEPHONE    HAS
DROPPED TO BELOW PRESPECIFIED
VALUE. YOU CAN NOT USE
FACSMILE COMMUNICATION.

FACSIMILE DEVICE AND COMMUNICATION CONTROL METHOD THEREOF

This application is a continuation of application Ser. No. 08/181,099, filed on Jan. 13, 1994, now abandoned.

FIELD OF THE INVENTION

The present invention relates to a facsimile device and communication control method thereof which can be used in connection with a portable telephone.

BACKGROUND OF THE INVENTION

In recent years, because of availability of various types of compact electronic device and improvement in the radio technology, portable telephones have become very popular and are now widely used. Of the portable telephones as described above, some work on a built-in battery such as an electric battery cell, while the others work on power from such a power supply source as a cigarette lighter socket of a motor vehicle.

Also in association with popularization of portable telephones, a facsimile device which can be used in connection with the portable telephone as described above has been developed.

In the conventional type of facsimile device, however, when the facsimile device is connected to a portable telephone, if voltage of a built-in battery in the portable telephone is low, sometimes a quality of reproduced image may be deteriorated, or an error may be generated due to disconnection of the communication line, and for this reason an operator must check voltage of the built-in battery before start of use, which is troublesome to the operator.

Also in practical use, an operator sometimes starts facsimile communication without checking voltage of a built-in battery of a portable telephone, and voltage of the built-in battery in the portable telephone may drop during facsimile communication to deteriorate a quality of reproduced images or generate an error due to disconnection of the communication line, which in turn gives damages to reliability of facsimile communication. Also in the cases as described above, the operator can not always identify the cause for the error, so that the work efficiency and the operability of the facsimile device becomes worse.

Furthermore, if a conventional type of facsimile device is connected to a portable telephone receiving power from a cigarette lighter socket of a motor vehicle, also the facsimile device is placed in the motor vehicle, but as the cigarette lighter socket is used by the portable telephone, another power supply unit is required for the facsimile device, which is inconvenient in practical use.

SUMMARY OF THE INVENTION

It is a first object of the present invention is to eliminate the trouble of checking voltage of a built-in battery in a portable telephone and improve its operability.

Also it is a second object of the present invention is to prevent voltage of a built-in battery in a portable telephone from becoming too lower during facsimile communication for insuring a high reliability of the facsimile device.

Furthermore it is a third object of the present invention is to improve workability as well as operability of a portable telephone after an error occurs.

In addition, it is a fourth object of the present invention is to improve convenience of a facsimile device when used in connection with a portable telephone set receiving power from a cigarette lighter socket of a motor vehicle.

In order to achieve the first object described above, the present invention provides a facsimile device which can be used in connection with a portable telephone working on a built-in battery, comprising voltage detecting means for detecting voltage of the built-in battery in the portable telephone set and control means for inhibiting facsimile communication based on the voltage detected by the voltage detecting means when facsimile communication using a portable telephone is carried out.

Also in order to achieve the second object described above, the present invention provides a facsimile device which can be used in connection with a portable telephone working on a built-in battery, comprising voltage detecting means for detecting voltage of the built-in battery in the portable telephone and control means for providing controls to forcefully terminate facsimile communication and return operating mode of a basic body of the facsimile device to a stand-by state when the voltage detected by the voltage detecting means drops to below a specified value during facsimile communication.

Furthermore in order to achieve the third object described above, the present invention provides a facsimile device having alerting means for notifying an operator, when the voltage detected by the voltage detecting means is below the specified value, of the fact that voltage of the built-in battery in the portable telephone has dropped to below the specified value.

Still furthermore in order to achieve the fourth object of the present invention, the present invention provides a facsimile device which can be used in connection with a portable telephone receiving power from a cigarette lighter socket of a motor vehicle, comprising power input means for receiving power from the cigarette lighter socket of the motor vehicle and cigarette lighter socket means for feeding power to the portable telephone.

In addition in order to achieve the objects described above, the present invention provides a facsimile device which can be used in connection with a portable telephone, having power supply means for supplying power to the portable telephone.

The facsimile device according to the present invention provides controls for inhibiting facsimile communication when voltage of a built-in battery in a portable telephone is too low, so that the trouble of checking voltage of a built-in battery in a portable telephone is eliminated and the operability is improved.

Also the facsimile device according to the present invention returns operating mode of a basic system of the facsimile device to a stand-by state by forcefully terminating facsimile communication when voltage of a built-in battery drops to below a specified value during facsimile communication, so that damage to reliability of the facsimile device due to shortage of voltage of the built-in battery in the portable telephone during facsimile communication can be prevented.

In addition the facsimile device according to the present invention notifies an operator, when voltage of a built-in battery is below a specified value, of the fact that voltage of the built-in battery of the portable telephone has dropped to below the specified value, so that the operator's work efficiency and the operability of the facsimile device can be improved.

Also the facsimile machine according to the present invention allows, when used in connection with a portable telephone receiving power from a cigarette lighter socket of a motor vehicle, use of the power input means to receive power for the facsimile device itself from the cigarette lighter socket of the motor vehicle and connection of the portable telephone to the cigarette lighter means to supply power to the portable telephone, so that the convenience of the facsimile device, when used in connection with a portable telephone receiving power from a cigarette lighter socket of a motor vehicle, can be improved.

Furthermore the facsimile device according to the present invention supplies power, when used in connection with a portable telephone, via power supply means to the portable telephone, so that the trouble of checking voltage of a built-in battery in the portable telephone is eliminated and the operability can be improved. Also operation of the facsimile device can be carried out without paying attention to voltage of the portable telephone.

Other objects and features of this invention will become understood from the following description with reference to the accompanying drawings.

BRIEF DESCRIPTION OF THE DRAWINGS

FIG. 4 is a view illustrating an example of printed message when voltage of a built-in battery in a portable telephone is too low;

DESCRIPTION OF THE EMBODIMENTS

Detailed description is made below for presently preferred embodiments of the present invention with reference to the related drawings.

Figure 1:
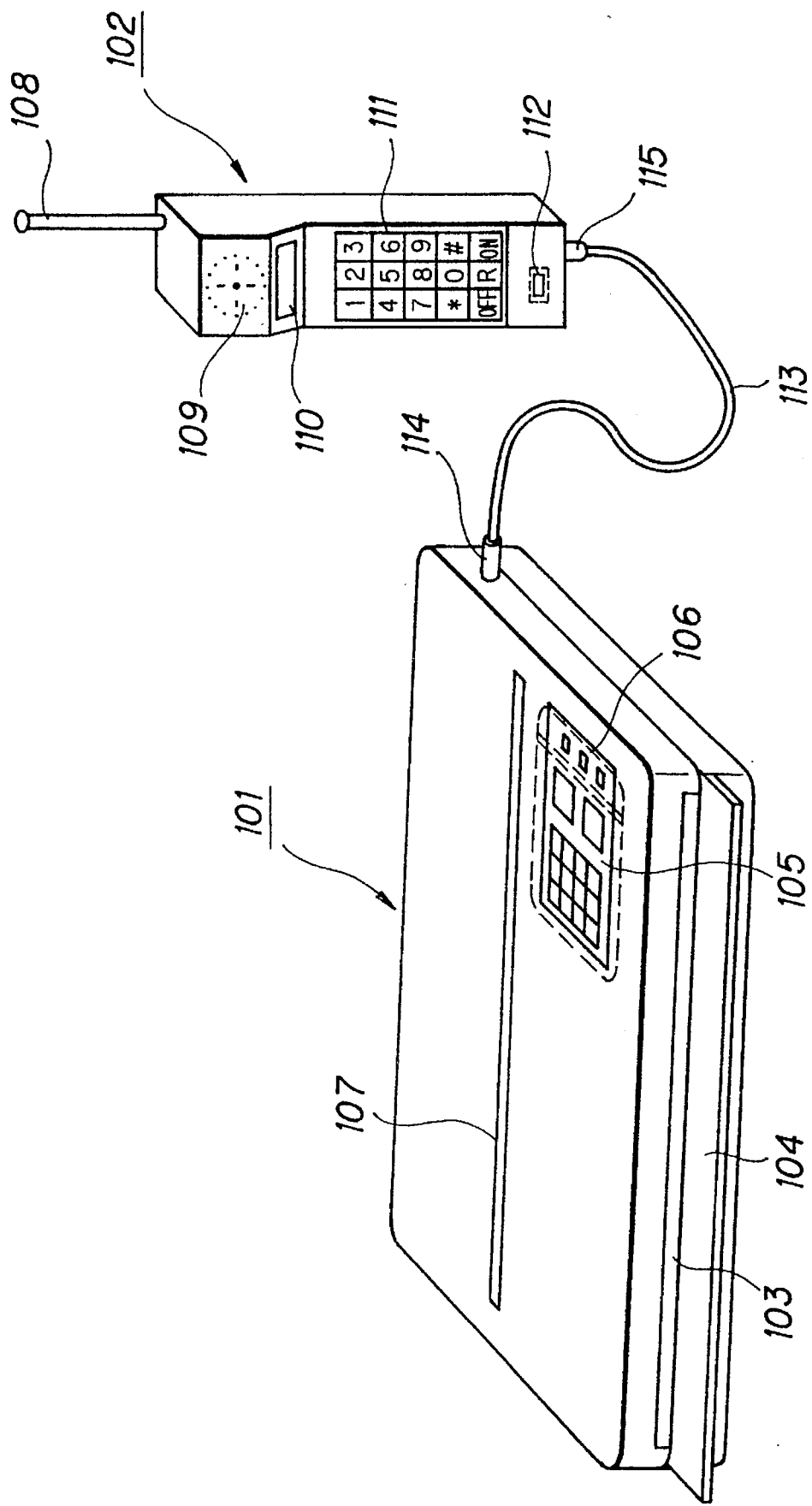
FIG. 1 is a view illustrating a facsimile device and a portable telephone in a first embodiment of the present invention.

FIG. 1 is a drawing illustrating appearance of a facsimile device as well as of a portable telephone in the first embodiment, and as shown in the figure a facsimile device 101 and a portable telephone 102 are connected to each other via a cable 113.

In the facsimile device 101 are provided a text sheet insert port 103 into which a text sheet to be transmitted through the facsimile device is inserted, a text sheet guide tray 104 to guide the text sheet, a plurality of operation keys 105 used to specify various types of operating mode and enter numeric values, a plurality of indicator lamps 106 to indicate operating mode as well as operating state of the facsimile device 101, and a text form discharge port 107 to discharge a text sheet, an image of which has been read.

In the portable telephone 102 are provided an antenna 118 for radio communication to connect with a telephone line network (public line network), a speaker 109 for output of incoming calls, a display section 110 and an operation key 111 to execute various types of operation, and a microphone 112 for input of outgoing calls. It is needless to say that the portable telephone 102 can be used as a single unit for freely receiving or sending calls via a telephone line network to talk with other people.

By connecting the facsimile device 101 described above to the portable telephone 102, as shown in the figure, via a cable 113, it is possible to carry out facsimile transmission of image information on a text sheet read by the facsimile device 101 via the portable telephone 102 and also to receive images sent by means of facsimile transmission via the portable telephone 102. It should be noted that the reference numerals 114 and 115 indicate connector sections for the cable 113.

Figure 2:
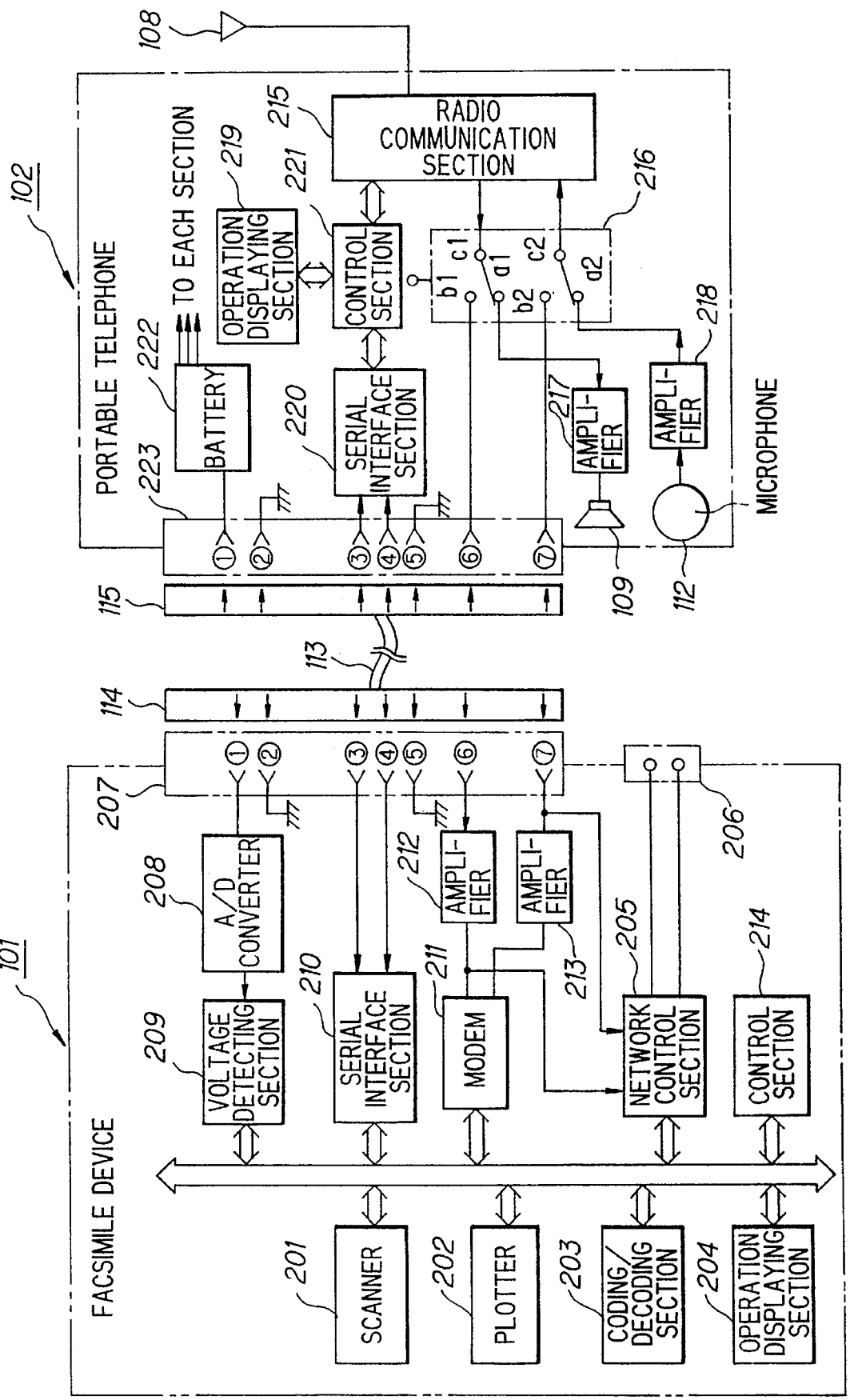
FIG. 2 is a block diagram illustrating the facsimile device and the portable telephone in the first embodiment of the present embodiment 1.

FIG. 2 is a block diagram illustrating the facsimile device 101 and the portable telephone 102. The facsimile device 101 comprises a scanner 201 to read image information from a text sheet, a plotter 202 to record the image information on recording paper, a coding/decoding section 203 to carry out data compression (coding) of image information to be sent as well as data extension (decoding) of received image information, an operation displaying section 204 used when operational instructions are entered with the operation key 105 and providing controls over displays concerning operating states of the device, a network control section 205 for line control when a call comes in or goes out while the facsimile device is being connected to a common telephone line network (namely while the facsimile device 101 is being directly connected to a telephone line network via a wire circuit), a connection terminal 206 to connect the facsimile device 101 to a telephone line network, a connector section 207 for connection with the portable telephone 102 with the cable 113, an A/D converter 208 which inputs an analog signal for voltage of a battery 222 (described hereinafter) in the portable telephone 102 via a pin of the connector section 207 and converts the analog signal to a digital one, a voltage detecting section 209 to which the digital signal is entered from the A/D converter 208 and which detects voltage of the battery 222 depending on the input signal, a serial interface section 210 for transaction of control signals to and from the portable telephone 102, a modem 211 for sending and receiving image information according to any known facsimile transmission sequence (for instance, the G3 facsimile transmission sequence), amplifiers 212 and 213 to amplify signals for an input line or an output line of the modem 211, and a control section 214 comprising a microcomputer for controlling each of the sections described above.

It should be noted that the connector section 207 is a 7-pin connector, and as for the pin arrangement, pin ① (signal pin No. 1) is for power, pin ② for GND (ground), pins ③ and ④ for control signal, pin ⑤ for GND for control signal, pin ⑥ for input image information (for call signal for the speaker in the side of the portable telephone 102), and pin ⑦ for output image information (for call signal for the microphone in the side of portable telephone 102). It should be noted that the pin arrangement in the connector section as described above is disclosed only as an example and not for limiting the present invention in any mean.

On the other hand, the portable telephone 102 comprises a radio communication section 215 for executing transactions of specified communication controls, when receiving or sending calls, with a radio station in the telephone line network to form a communication line with a communication partner, a switching circuit 216 for switching between a receiver and a sender for a call sent or received via the radio communication section 215, an amplifier 217 for amplifying a call signal received by the radio communication section 215 and sending the amplified signal to the speaker 109, an amplifier 218 for amplifying a call signal entered via the microphone 112 and sending the amplified signal to the radio communication section 215, an operation displaying section 219 for displaying text information via the display section 110 or entering operational information with the operation key 111, a serial interface section 220 for transaction of control signals with the facsimile device 101, and a control section 221 comprising a microcomputer for controlling each of the sections described above.

It should be noted that the reference numeral 222 indicates a built-in battery in the portable telephone 102 and power is supplied to each of the foregoing sections.

The reference numeral 223 indicates a connector section used for connection to the facsimile device 101 via the cable 113. This connector section 223 is a 7-pin connector, and as for the pin arrangement, pin ① (signal pin No. 1) is for power supplied from the battery 222, pin ② is for GND (grounding), pins ③ and ④ for control signals, pin ⑤ for GND for control signals, pin ⑥ is for call signals for the speaker, and pin ⑦ for call signals for the microphone.

The switching circuit 216 has a common terminal c1, contacts a1 and b1 each connected to the common terminal c1 by switching, a common terminal c2, and contacts a2 and b2 each connected to the common terminal c2 by switching, and a call signal received by the radio communication section 215 is sent to the speaker 109 by connecting the common terminal c1 to the contact a1 upon input of a control signal from the control section 221, while a call signal entered from the microphone 112 is sent to the radio communication section 215 by connecting the common terminal c2 to the contact a2 also upon input of a control signal from the control section 221. Also a call signal received by the radio communication section 215 is sent via pin 6 in the connector section 223 to the facsimile device 101 by connecting the common terminal c1 to the contact b1, while a call signal sent from the facsimile device 101 is sent via pin ⑦ in the connector section 223 to the radio communication section 215 by connecting the common terminal c2 to the contact b2.

Next description is made for operations of the facsimile device having the configuration as described above with reference to flowcharts shown in FIGS. 3A and 3B.

At first, the connector sections 114 and 115 of the cable 113 are engaged with the connector section 207 of the facsimile device 101 and the connector section 223 of the portable telephone 102 respectively, the portable telephone 102 is connected to the facsimile device 101 via the cable 113, and the portable telephone 102 is turned on, when the portable telephone 102 sends a connection check signal (check command which is one of control signals) through the cable 113 to peripheral devices.

When a control section 214 of the facsimile device 101 receives the connection check signal, the control section 214 outputs, as response signals, a command indicating that the signal has been received by the facsimile device 101 as well as a status command indicating that the facsimile device 101 is ready for starting operation.

When the portable telephone 102 receives the response signals, the portable telephone 102 checks that the peripheral device is the facsimile device 101 and outputs a connection check signal indicating that is ready for starting operation.

On the other hand, when the facsimile device 101 receives the foregoing connection check signal, the facsimile device 101 determines that the portable telephone 102 has been connected to the facsimile device 101. Also the portable telephone 102 periodically sends a connection check signal for checking any peripheral device connected thereto and the connection state thereof.

Figure 3A:
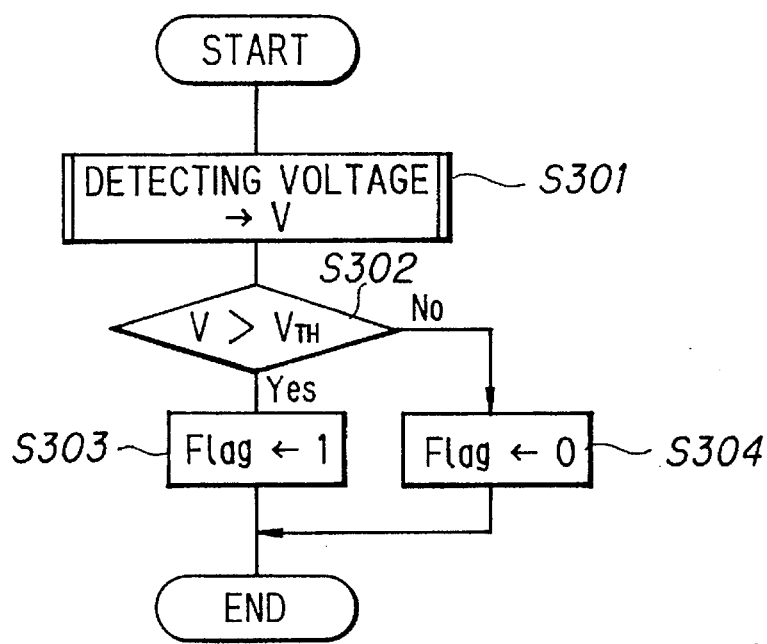
FIGS. 3A and 3B show flow chart of processing for checking voltage and a flow chart of processing for starting communication both in the first embodiment 1 of the present invention.

Thus, once the portable telephone 102 is connected to the facsimile device 101 and the control section 214 checks that the portable telephone 102 has been connected, the control section 214 executes a processing for checking voltage as shown in FIG. 3A to detect voltage V of the portable telephone 102 (namely voltage of the battery 222) via the voltage detecting section 209 (S301), compares the detected voltage V to a prespecified threshold value $V_{TH}$ (S302), sets 1 at the voltage flag (Flag) if V is larger than $V_{TH}$, and 0 at the voltage flag (Flag) if V is not larger than $V_{TH}$ (S303, S304).

Now concrete description is made below for operation to detect voltage V with the voltage detecting section 209. When the facsimile device 101 is connected via the cable 113 to the portable telephone 102, pin ① in the connector section 207 is connected via the connector sections 114 and 115 and the connector section 223 to the battery 222. Voltage of the battery 222 (analog signal) is entered from pin ① of the A/D convertor 208, which converts the analog signal to a digital signal and sends the signal to the voltage detecting section 209. The voltage detecting section 209 detects a preset voltage value corresponding to a value of the digital signal as voltage V and sends a signal indicating the voltage V to the control section 214.

Figure 3B:
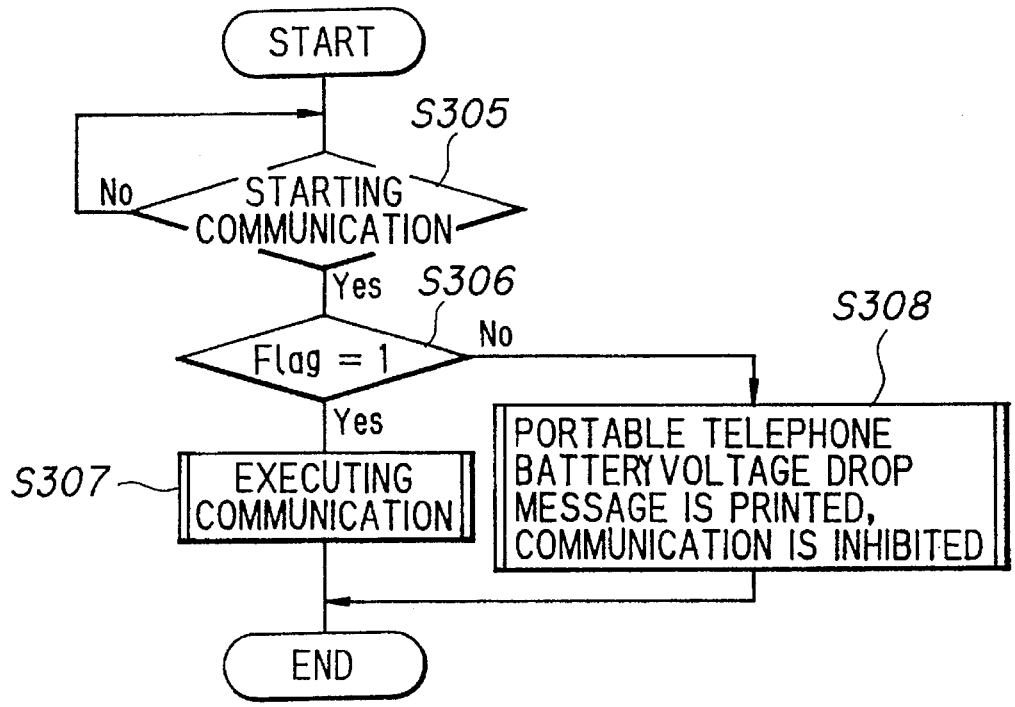

Then, the control section 214 executes a processing for starting communication as shown in FIG. 3B. When an operator enters a command for starting facsimile communication by pressing a start key which is one of the operation keys 105 (S305), the control section 214 checks the voltage flag (Flag) (S306) and, if Flag is 1, executes facsimile communication (S307) because voltage of the built-in battery in the portable telephone 102 is normal (the voltage has not dropped to below a prespecified value). If Flag is 0, it indicates that voltage of the built-in battery in the portable telephone 102 has dropped to below the prespecified value, so that the portable telephone battery voltage drop message 401 is printed (or displayed), facsimile communication is inhibited, and the processing is terminated (S308).

As for the timing to print the portable telephone battery voltage drop message 401, the facsimile device 101 may usually be set in a stand-by state so that the message 401 is automatically outputted when voltage drop is detected. However, the control section 214 periodically (for instance, once every 160 ms) executes the processing for checking voltage after the portable telephone 102 has been connected, and, when the facsimile device 101 is in a stand-by state, determines that the voltage is below the prespecified value if voltage V is lower than the threshold value $V_{TH}$ continuously for 3 seconds.

Although the possibility can be considered that, after the facsimile device 101 detects voltage drop in the portable telephone 102 and inhibits facsimile communication, a call (recall) is transmitted from the partner machine and facsimile communication is restarted, the control section 214 can provide controls so that, once voltage drop is detected, automatic receiving is inhibited until a power switch of the facsimile device 101 is turned off to prevent line connection when the voltage has dropped to below the prespecified value, thus line connection being prevented when the voltage is below the prespecified value.

It is needless to say that, if voltage drop is detected during facsimile transmission from the facsimile device 101 itself, facsimile transmission of image information stored in a memory (not shown) in the facsimile device 101 can be restarted by replacing the battery 222 (power battery cell) in the portable telephone 102 with a new one and turning on the switch of the portable telephone 102 again.

As described above, in the first embodiment of the present invention, as facsimile transmission by the facsimile machine is not started when a quantity of remaining battery liquid in the portable telephone 102 is small, a frequency of errors due to termination of battery's life is reduced and the communication quality is improved. In addition, even if the battery's life is terminated, a message indicating termination of the battery's life is provided, so that a work efficiency of the operator and the operability of the facsimile device are improved. Also in description of the first embodiment of the present invention, an example where the portable telephone battery voltage drop message 401 was provided, but if the facsimile device 101 has display means such as a LCD (Liquid Crystal Display) unit, the operator may be alerted by a display in the display means.

Figure 5:
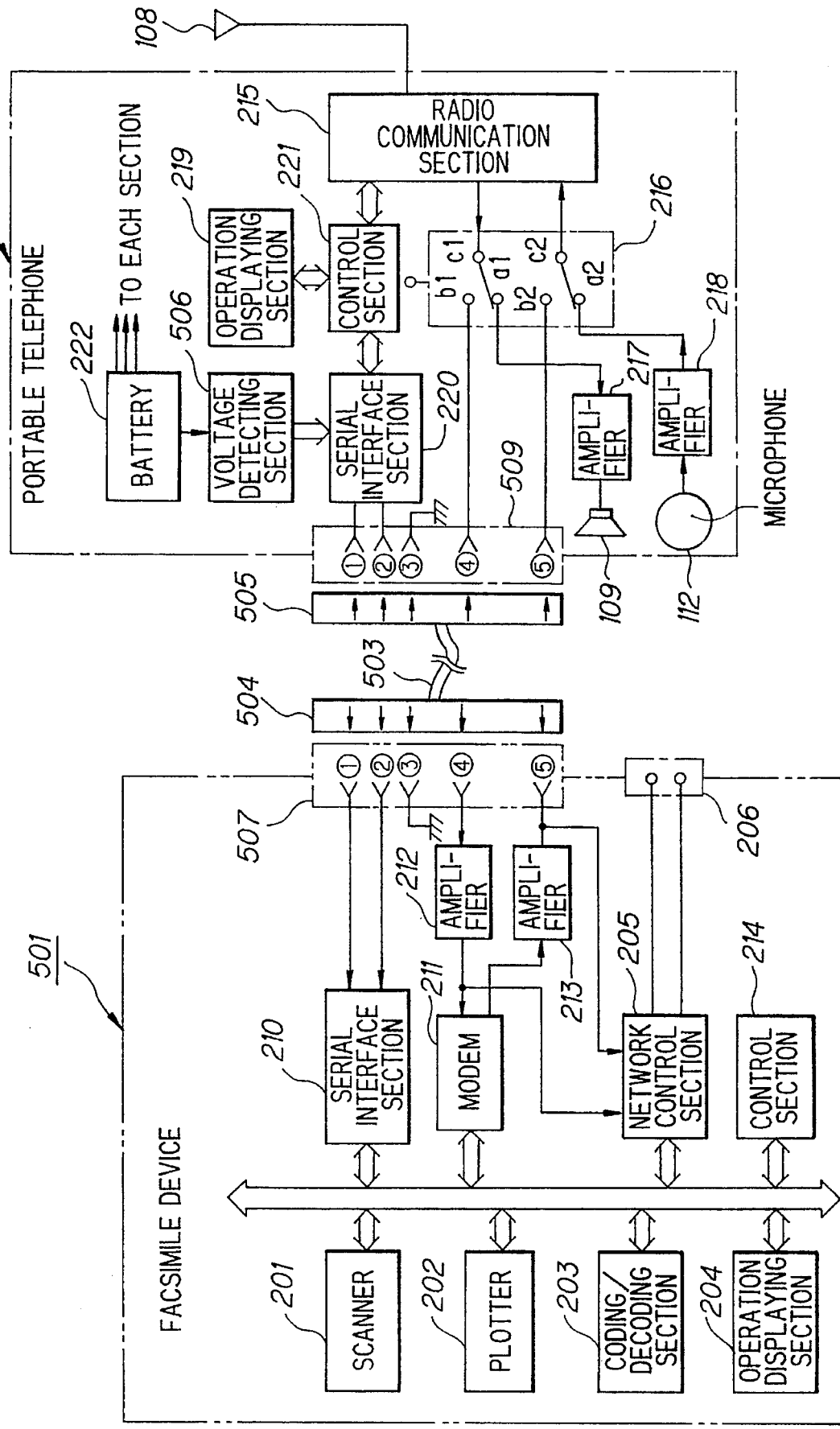
FIG. 5 is a block diagram illustrating a facsimile device and a portable telephone in a second embodiment 2 of the present invention.

FIG. 5 is a general block diagram illustrating configuration of a facsimile device 501 as well as of a portable telephone device 502 in the second embodiment of the present embodiment. In the first embodiment, the A/D convertor 208 and the voltage detecting section 209 are provided in the facsimile device 101 to detect voltage of the portable telephone, but in the second embodiment, a voltage detecting section 506 is provided in the portable telephone 502 to directly detect voltage of the battery 222 and generate voltage date, which is transferred via the serial interface section 220 to the facsimile device 501. It should be noted that the basic configuration of the second embodiment is the same as that of the first embodiment and detailed description is made below for only the different portions.

The facsimile device 510 has the scanner 201, plotter 202, coding/decoding section 203, operation display section 204, network control section 205, line connection terminal 206, connector section 507, serial interface section 210, modem 211, amplifier 212, amplifier 213, and control section 214. Herein the connector 507 is a 5-pin connector, and as for the pin arrangement, pins ① and ② are for control signals, pin ③ for GDN for control signals, pin ④ for input image information (a call signal for the speaker in the side of the portable telephone 502), and pin ⑤ for output image information (a call signal for the microphone in the side of the portable telephone 502). Note that the pin arrangement in the connector section 507 is an example and does not limit the present invention in any means.

On the other hand, the portable telephone 502 has the radio communication section 215, switching circuit 216, amplifier 217, amplifier 218, operation displaying section 219, serial interface section 220, speaker 109, microphone 112, connector section 509, control section 221, battery 222 and voltage detecting section 506 to detect voltage of the battery 222 and output voltage data (digital signal). Herein the output connector section 509 is a 5-pin connector, and as for the pin arrangement, pins ① and ② are for control signals, pin ③ for GND for control signals, pin ④ for a call signal for the speaker, and pin ⑤ for a call signal for the microphone. Furthermore in the second embodiment, also the connector sections 504 and 505 of the cable 503 for connection between the facsimile device 501 and the portable telephone 502 comprise a 5-pin connector respectively as shown in the figure.

Figure 6A:
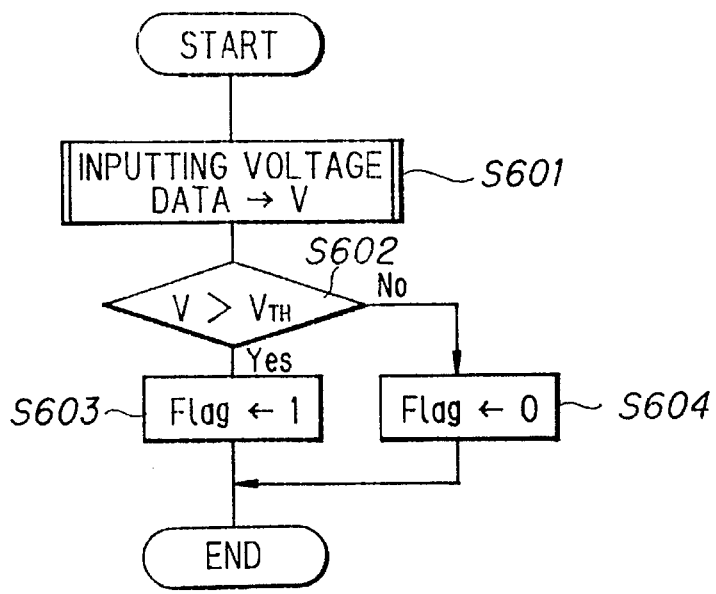
FIGS. 6A and 6B show flow chart of processing for checking voltage and a flow chart for interrupting communication both in the second embodiment the present invention.
Figure 6B:
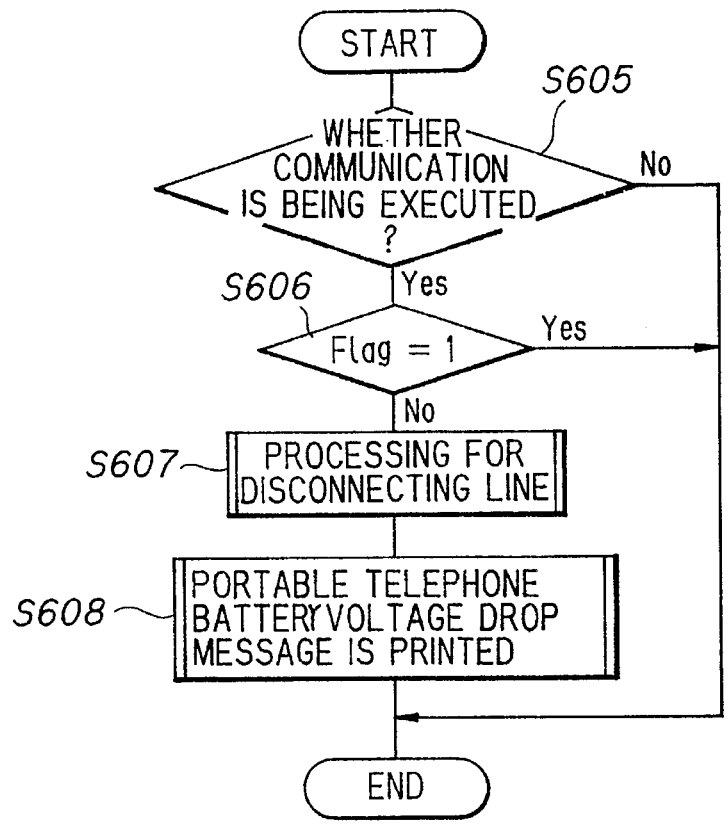

Next description is made for operations of the facsimile device 501 with reference to the flowcharts shown in FIGS. 6A and 6B.

At first, the connector sections 504 and 505 of the cable 503 are engaged in the connector section 507 of the facsimile device 501 and the connector section 509 of the portable telephone 502 respectively, the portable telephone 502 is connected via the cable 503 to the facsimile device 501, and the portable telephone 502 is turned on, when the portable telephone 502 sends a connection check signal (a check command which is one of control signals) to peripheral devices connected via the cable 503 to the portable telephone 502.

When the control section 214 of the facsimile device 501 receives the connection check signal, the control section 214 outputs, as response signals, a command indicating that the connection check signal has been received by the facsimile device 501 as well as a status command indicating that the facsimile device 501 is ready for starting operation.

When the portable telephone 502 receives the response signal, the portable telephone 502 checks that the peripheral device is the facsimile device 501 and is ready for starting operation.

Also in the portable telephone 402, the voltage detecting section 506 periodically (for instance, once for every 160 ms) checks voltage of the battery 222 and sends the measured value as voltage data V via the serial interface section 220 to the facsimile device 501.

When the portable telephone 502 is connected to the facsimile device 501, the control section 214 executes a processing for checking voltage as shown in FIG. 6A, at first inputs voltage data V for the portable telephone 502 via the serial interface section 210 (S601), compares the voltage data V to a prespecified threshold value $V_{TH}$ (S602), sets 1 in the voltage flag (Flag) if V is larger than $V_{TH}$, and 0 in the voltage flag (Flag) if V is not larger than $V_{TH}$ (S603, S604).

Then the control section 214 executes a processing for interrupting communication as shown in FIG. 6B at a prespecified timing. At first, the control section 214 makes determination as to whether facsimile communication is being executed (S605), and checks the voltage flag (Flag). If facsimile communication is being executed (S606), and if Flag is not 1, it indicates that voltage of a built-in battery in a portable telephone 502 has dropped to below a prespecified value, so that the control section 214 executes a processing for disconnecting the line to forcefully terminate facsimile communication, returns the operating mode to a stand-by state (S607), then prints the portable telephone battery voltage drop message 401 as shown in FIG. 4, and terminated the processing (S608). If facsimile communication is not being executed, or if Flag is 1, the control section 214 terminates the processing immediately.

As described above, in the second embodiment, if voltage of the battery in the portable telephone drops to below the prespecified value during facsimile communication, facsimile communication is terminated and a stand-by state is restored, so that the abnormal state can be notified to the partner, which contributes to improvement of reliability of the facsimile device. Also, if the battery's life is terminated, a message indicating termination of the battery's life is printed, so that the operator's work efficiency and operability of the facsimile device can be improved.

Figure 7:
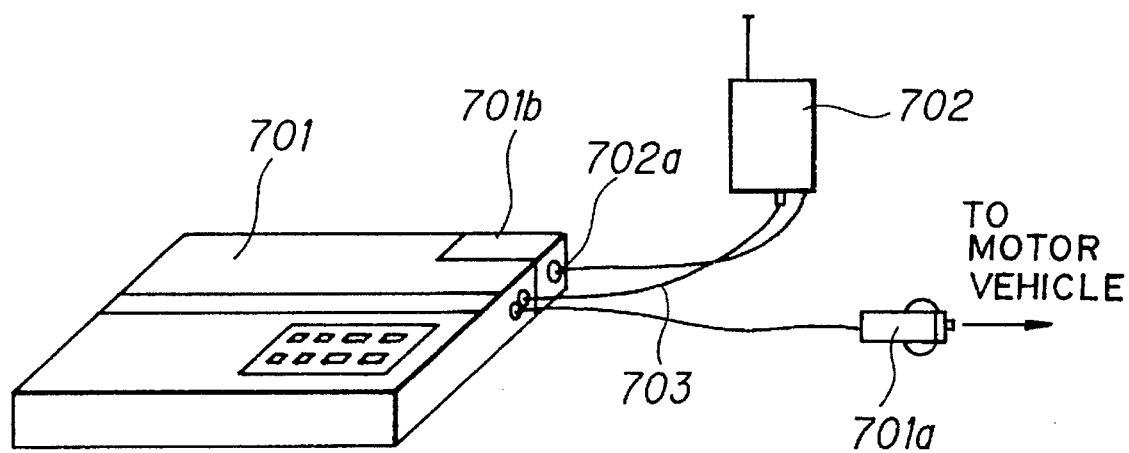
FIG. 7 is a view illustrating a facsimile device and a portable telephone in a third embodiment of the present invention.

FIG. 7 is a drawing illustrating general configuration of a facsimile device as well as of a portable telephone in the third embodiment of the present invention. The third embodiment is a case where both a facsimile device 701 and a portable telephone 702 receive power from a cigarette lighter socket (not shown) of a motor vehicle, and the facsimile device 701 a connector section 701a comprising a cable and a connector both for receiving power from the cigarette lighter socket of the motor vehicle and a cigarette lighter socket section 701b for feeding power to the portable telephone 702. It should be noted that the reference numeral 703 indicates a cable for input/output of control signals and call signals.

On the other hand, the portable telephone 702 has a connector section 702a comprising a cable and a connector both for receiving power from a cigarette lighter socket of a motor vehicle, and can receive power via the facsimile device 701 from the cigarette lighter socket of the motor vehicle when the connector section 702a is inserted into the cigarette lighter socket section 701b of the facsimile device 701.

Generally there is only one cigarette lighter socket in a motor vehicle. For this reason, when facsimile communication is executed by using a portable telephone in a motor vehicle, such a device as making either the facsimile device or the portable telephone work on a power battery cell is required, but in the third embodiment the facsimile device 701 has a cigarette lighter socket 701b incorporated therein, so that the power supply source in the motor vehicle can be used by both the facsimile device and the portable telephone simultaneously, which contributes to improvement of operability of the facsimile device.

Figure 8:
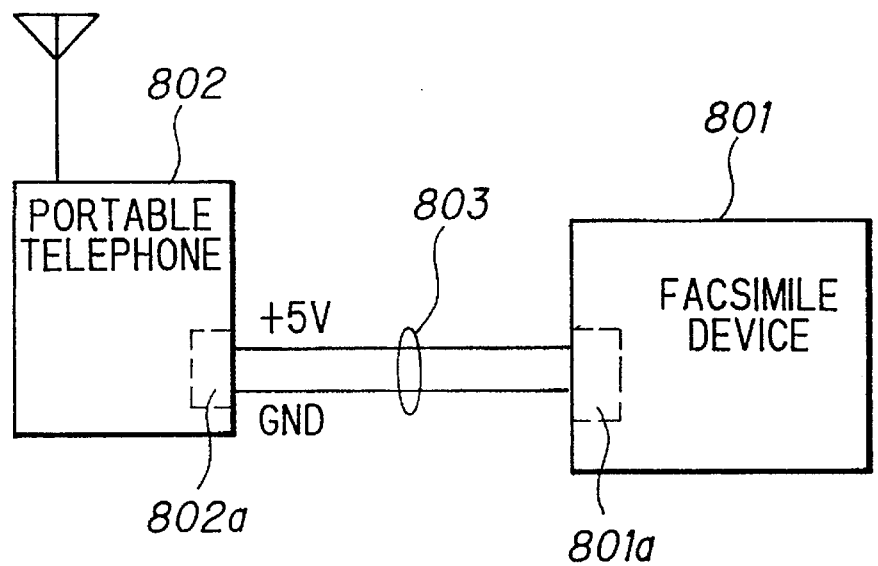
FIG. 8 is a view illustrating general configuration of a facsimile device and a portable telephone in a fourth embodiment of the present invention.

FIG. 8 is a drawing illustrating general configuration of a facsimile device as well as of a portable telephone in the fourth embodiment of the present invention. In the fourth embodiment, a socket 801a dedicated to a portable telephone is provided in a facsimile device 801, and power for a portable telephone 802 is fed via a connector 802a in the side of the portable telephone 802 and a cable 803 from the socket 801a. Generally at least an analog signal line is required for connection between a facsimile device and a portable telephone. For this reason, configuration of the fourth embodiment can easily be realized by increasing several lines for the connection.

As described above, in the fourth embodiment, power for a facsimile device can also be used as power for a portable telephone set, so that a frequency of termination of a battery's life is reduced and the operability is improved.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A facsimile device which can be used in connection with a portable telephone working on a built-in battery comprising:

voltage detecting means for detecting voltage of said built-in battery in said portable telephone;

connection verification means for performing a connection check procedure which indicates whether said facsimile device is properly connected to and communicating with the portable telephone; and control means, connected to the voltage detecting means and the connection verification means, for providing controls to inhibit facsimile communication depending on a voltage detected by said voltage detecting means upon a positive result from the connection check procedure performed by the connection verification means which indicates that the facsimile device is properly connected to and communicating with the portable telephone.

2. A facsimile device as set forth in claim 1, further comprising alert means for notifying an operator of a fact that voltage of said built-in battery of said portable telephone has dropped when a voltage detected by said voltage detecting means is below a prespecified value.

3. A facsimile device which can be used in connection with a portable telephone working on a built-in battery, comprising: a new voltage detecting means for detecting voltage of said built-in battery of said portable telephone; and control means for providing controls to forcefully terminate facsimile communication and return operating state of said facsimile device to a stand-by state when a voltage detected by said voltage detecting means has dropped to below a prespecified value during facsimile communication.

4. A facsimile device as set forth in claim 3, further comprising alert means for notifying an operator of a fact that voltage of said built-in battery of said portable telephone has dropped when a voltage detected by said voltage detecting means is below said prespecified value.

5. A communication control method of a facsimile device comprising the steps of:

verifying whether said facsimile device is properly connected to and communicating with a portable telephone;

detecting voltage of the portable telephone;

comparing said detected voltage to a prespecified threshold value;

setting 1 (or 0) at a voltage flag if said detected voltage is larger than said prespecified threshold value; and setting 0 (or 1) at said voltage flag if said detected voltage is smaller than said prespecified threshold value;

wherein said steps of detecting, comparing and setting are executed after a positive result is obtained from the verifying step which indicates that the facsimile device is properly connected to and communicating with the portable telephone.

6. A communication control method of a facsimile device as set forth in claim 5, further comprising the steps of:

starting facsimile communication by pressing a start key;

checking said voltage flag;

executing facsimile communication if said voltage flag is 1 (or 0);

indicating a portable telephone battery voltage drop message is printed (or displayed); and inhibiting said facsimile communication.

7. A communication control method of a facsimile device as set forth in claim 5, further comprising the steps of:

making determination as to whether facsimile communication is being executed;

checking said voltage flag if facsimile communication is being executed;

executing a processing for disconnecting a line to forcefully terminate facsimile communication if said voltage flag is not 1 (or 0); and printing (or displaying) a portable telephone battery voltage drop message.

8. A facsimile device which can be used in connection with a portable telephone receiving power from a cigarette lighter socket of a motor vehicle comprising:

a power input connector for receiving power from the cigarette lighter socket of the motor vehicle and transfer the power to the facsimile device through a cable;

cigarette lighter socket, separate from the cigarette lighter socket of the motor vehicle, for feeding power to the portable telephone.

* * * * *